US009801006B2

(12) United States Patent
Olgun et al.

(10) Patent No.: US 9,801,006 B2
(45) Date of Patent: *Oct. 24, 2017

(54) NFC ANTENNA ARCHITECTURE FOR MOBILE COMMUNICATION DEVICE WITH SINGLE-PIECE METAL HOUSING

(71) Applicant: Motorola Mobility LLC, Chicago, IL (US)

(72) Inventors: Ugur Olgun, Chicago, IL (US); Mohammed Abdul-Gaffoor, Palatine, IL (US); Abu T Sayem, Gurnee, IL (US); Hugh K Smith, Palatine, IL (US)

(73) Assignee: Motorola Mobility LLC, Chicago, IL (US)

( * ) Notice: Subject to any disclaimer, the term of this patent is extended or adjusted under 35 U.S.C. 154(b) by 23 days.

This patent is subject to a terminal disclaimer.

(21) Appl. No.: 14/824,240

(22) Filed: Aug. 12, 2015

(65) Prior Publication Data

US 2017/0048649 A1    Feb. 16, 2017

(51) Int. Cl.

| H04W 4/00 | (2009.01) |
| H01Q 1/24 | (2006.01) |
| H01Q 21/30 | (2006.01) |
| H01Q 7/04 | (2006.01) |
| H01Q 7/00 | (2006.01) |
| H04B 5/00 | (2006.01) |
| H01Q 9/42 | (2006.01) |

(Continued)

(52) U.S. Cl.
CPC ............ *H04W 4/008* (2013.01); *H01Q 1/243* (2013.01); *H01Q 7/00* (2013.01); *H01Q 7/04* (2013.01); *H01Q 21/30* (2013.01); *H04B 5/0081* (2013.01); *H01Q 5/35* (2015.01); *H01Q 9/42* (2013.01); *H04B 1/3827* (2013.01); *H04M 2250/04* (2013.01)

(58) Field of Classification Search
CPC combination set(s) only.
See application file for complete search history.

(56) References Cited

U.S. PATENT DOCUMENTS 8,779,999 B2 *  7/2014 Gummalla ............ G06F 1/1656
                                                                 343/702
9,148,190 B1 *  9/2015 Buuck ...................... H04B 1/38
(Continued)

FOREIGN PATENT DOCUMENTS

JP        3198270 U     6/2015

OTHER PUBLICATIONS

Search Report for related European Application No. EP16183202.7; dated Jan. 10, 2017.

*Primary Examiner* — Junpeng Chen
(74) *Attorney, Agent, or Firm* — Miller, Matthias & Hull LLP

(57) ABSTRACT

Systems and methods for providing NFC (near field communications) in a portable communications device utilize antenna arms formed from openings in a metal unibody construction. Two of the antenna arms are driven by WiFi and cellular drives respectively, while an NFC antenna drive sharing the same mechanical connections provides a differential drive across the antenna ends, forming a primary NFC coil. In an embodiment, a smaller multi-turn coil is connected to the primary NFC coil, and may overlay a device speaker and may also be shielded by a ferrite material.

20 Claims, 8 Drawing Sheets

(51) Int. Cl.
    *H04B 1/3827*    (2015.01)
    *H01Q 5/35*      (2015.01)

(56) References Cited

U.S. PATENT DOCUMENTS

| | | | |
|---|---|---|---|
| 2010/0277383 A1* | 11/2010 | Autti | H01Q 1/243 |
| | | | 343/749 |
| 2010/0279734 A1* | 11/2010 | Karkinen | H01Q 3/24 |
| | | | 455/554.2 |
| 2014/0015724 A1* | 1/2014 | Bungo | H01Q 13/10 |
| | | | 343/767 |
| 2014/0139380 A1 | 5/2014 | Ouyang et al. | |
| 2014/0160951 A1* | 6/2014 | Alpert | H04W 84/12 |
| | | | 370/252 |
| 2014/0333486 A1* | 11/2014 | Greetis | H01Q 1/52 |
| | | | 343/702 |
| 2015/0044963 A1 | 2/2015 | Konanur et al. | |
| 2016/0301139 A1* | 10/2016 | Lombardi | H01Q 1/243 |
| 2017/0098951 A1* | 4/2017 | Olgun | H02J 7/025 |

\* cited by examiner

NFC ANTENNA ARCHITECTURE FOR MOBILE COMMUNICATION DEVICE WITH SINGLE-PIECE METAL HOUSING

TECHNICAL FIELD

The present disclosure is related generally to wireless communication technologies for mobile devices, and, more particularly, to a system and method for near field communications (NFC) to and from a device having a metal housing.

BACKGROUND

In addition to WiFi, GPS and cellular communications, mobile communication devices increasingly also provide NFC. An NFC antenna is typically a conductive loop that is configured to transmit and detect magnetic fields. An NFC antenna is commonly referred to as an NFC coil.

An NFC coil is often placed behind the back housing of a mobile communication device. Portable communication devices such as cellular phones have typically incorporated a non-conductive back housing (e.g. plastic), or an appropriate opening in a conductive back housing, to allow an embedded NFC coil to freely communicate. The opening is necessary otherwise the magnetic fields generated by the NFC coil would be trapped between the conductive internal components of the mobile device and the conductive housing. In essence, the opening in the conductive back housing provides a mechanism to interrupt eddy currents induced by the NFC coil and allows for NFC communication. Thus, internal NFC coils typically require an open (nonconductive) path through the back of the device.

In an effort to deliver more premium electronic devices to consumers, cellular phone manufacturers are increasingly employing exterior housings fabricated from metal alloys. In addition, mobile communication devices are handled frequently, and plastic housings are weaker than metal ones of similar thickness, hence allowing more frequent damage and breakage. Similarly, a metal housing with an opening over an internal NFC coil is still weaker than a unibody metal construction, is more expensive and complex to manufacture than a unibody construction, and is aesthetically less pleasing than a unibody construction.

Before proceeding, it should be appreciated that the present disclosure is directed to a system that can eliminate some of the shortcomings noted in this Background section. However, any such benefit is not a limitation on the scope of the disclosed principles, or of the attached claims, except to the extent expressly noted in the claims. Additionally, the discussion of technology in this Background section is reflective of the inventors' own observations, considerations, and thoughts, and is in no way intended to accurately catalog or comprehensively summarize any prior art reference or practice. As such, the inventors expressly disclaim this section as admitted or assumed prior art. Moreover, the identification herein of desirable courses of action reflects the inventors' own observations and ideas, and should not be assumed to indicate an art-recognized desirability.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Before presenting a detailed discussion of embodiments of the disclosed principles, an overview of certain embodiments is given to aid the reader in understanding the later discussion. As noted above, portable communication devices generally incorporate a plastic housing, or an opening in a conductive housing, to allow the embedded NFC coil of the device to freely communicate. The latter prevents the generation of opposing magnetic fields induced by eddy currents, which occurs if the NFC coil is completely covered by a conductive material. However, both of these options provide a housing that is weaker and more expensive than one constructed from a metal unibody.

In an embodiment of the disclosed principles, a mobile communication device is provided having a single-piece metal housing with openings at both ends. The openings on the housing form a plurality of arms that function as antennas in the finished device. In an example wherein four such arms are included, the housing may be configured with two arms at one end of the housing (e.g. the top side) and two arms at the opposite end of the housing (e.g., the bottom side). Various ones of these antennas may be used for GPS geo-location services, WiFi communications, cellular communications or a combination of these.

In addition to such uses, two of the antennas are selectively chosen in an embodiment to create a loop antenna usable for NFC signal transmission and reception. This use does not prevent or interfere with the continued use of each antenna for GPS geo-location services, WiFi communications, cellular communications, or a combination of these.

With this overview in mind, and turning now to a more detailed discussion in conjunction with the attached figures, the techniques of the present disclosure are illustrated as being implemented in a suitable computing environment. The following generalized device description is based on embodiments and examples within which the disclosed principles may be implemented, and should not be taken as limiting the claims with regard to alternative embodiments that are not explicitly described herein. Thus, for example, while FIG. 1 illustrates an example mobile device within which embodiments of the disclosed principles may be implemented, it will be appreciated that other device types may be used, including but not limited to laptop computers, tablet computers, embedded automobile computing systems and so on.

Figure 1:
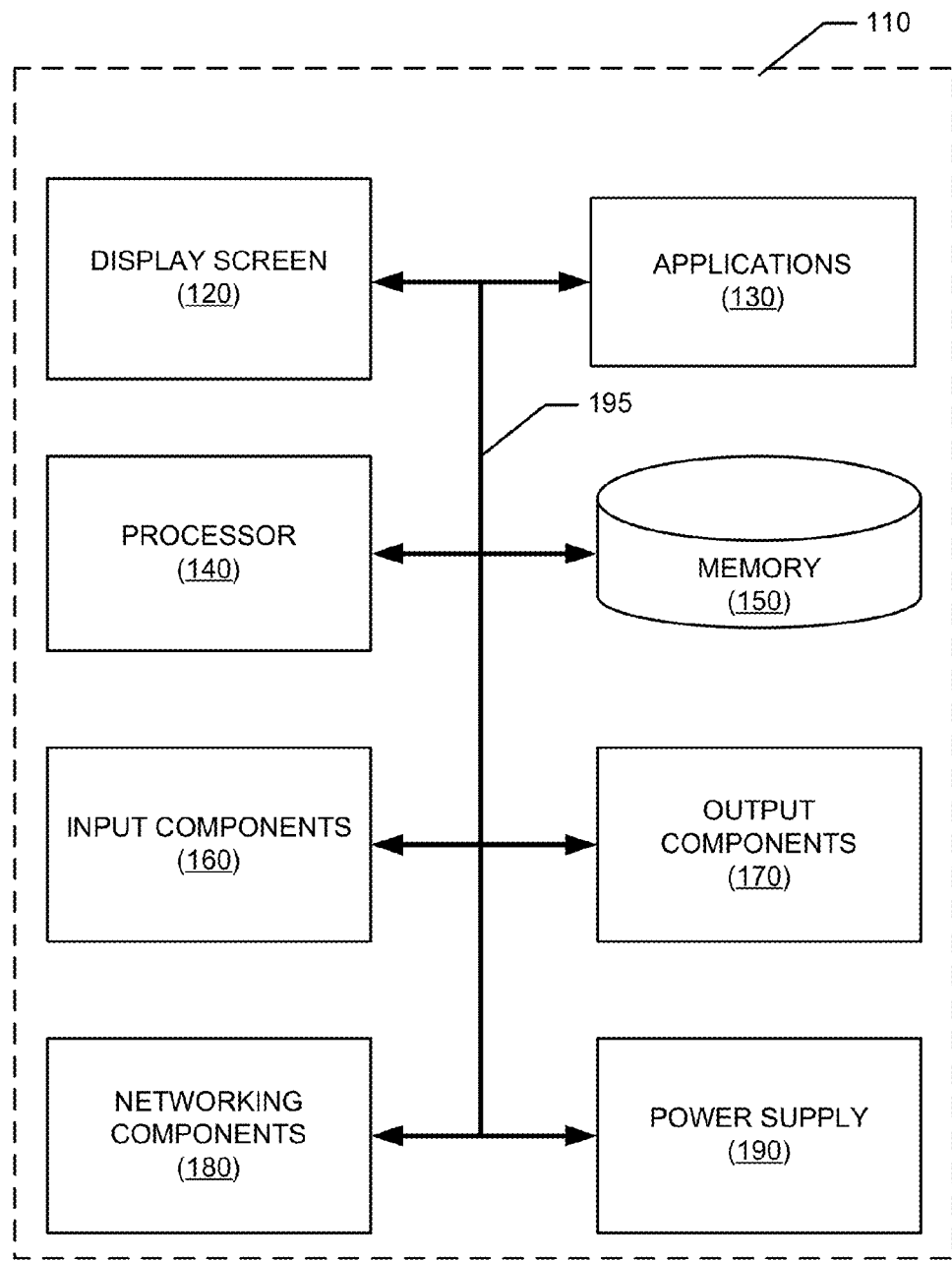
FIG. 1 is a simplified schematic of an example device with respect to which embodiments of the presently disclosed principles may be implemented.

The schematic diagram of FIG. 1 shows an exemplary device 110 forming part of an environment within which aspects of the present disclosure may be implemented. In particular, the schematic diagram illustrates a user device 110 including several exemplary components. It will be appreciated that additional or alternative components may be used in a given implementation depending upon user preference, component availability, price point and other considerations.

In the illustrated embodiment, the components of the user device 110 include a display screen 120, applications (e.g., programs) 130, a processor 140, a memory 150, one or more input components 160 such as speech and text input facilities, and one or more output components 170 such as text and audible output facilities, e.g., one or more speakers.

The processor 140 can be any of a microprocessor, microcomputer, application-specific integrated circuit, or the like. For example, the processor 140 can be implemented by one or more microprocessors or controllers from any desired family or manufacturer. Similarly, the memory 150 may reside on the same integrated circuit as the processor 140. Additionally or alternatively, the memory 150 may be accessed via a network, e.g., via cloud-based storage. The memory 150 may include a random access memory (i.e., Synchronous Dynamic Random Access Memory (SDRAM), Dynamic Random Access Memory (DRAM), RAMBUS Dynamic Random Access Memory (RDRM) or any other type of random access memory device or system). Additionally or alternatively, the memory 150 may include a read only memory (i.e., a hard drive, flash memory or any other desired type of memory device).

The information that is stored by the memory 150 can include program code associated with one or more operating systems or applications as well as informational data, e.g., program parameters, process data, etc. The operating system and applications are typically implemented via executable instructions stored in a non-transitory computer readable medium (e.g., memory 150) to control basic functions of the electronic device 110. Such functions may include, for example, interaction among various internal components and storage and retrieval of applications and data to and from the memory 150.

Further with respect to the applications, these typically utilize the operating system to provide more specific functionality, such as file system service and handling of protected and unprotected data stored in the memory 150. Although many applications may provide standard or required functionality of the user device 110, in other cases applications provide optional or specialized functionality, and may be supplied by third party vendors or the device manufacturer.

With respect to informational data, e.g., program parameters and process data, this non-executable information can be referenced, manipulated, or written by the operating system or an application. Such informational data can include, for example, data that are preprogrammed into the device during manufacture, data that are created by the device or added by the user, or any of a variety of types of information that are uploaded to, downloaded from, or otherwise accessed at servers or other devices with which the device is in communication during its ongoing operation.

Although not shown in detail in FIG. 1, the device 110 includes software and hardware networking components 180 to allow communications to and from the device. Such networking components provide wireless networking functionality, although wired networking may additionally or alternatively be supported. In an embodiment, as noted above, the networking components 180 include an NFC antenna.

In an embodiment, a power supply 190, such as a battery or fuel cell, may be included for providing power to the device 110 and its components. All or some of the internal components communicate with one another by way of one or more shared or dedicated internal communication links 195, such as an internal bus.

In an embodiment, the device 110 is programmed such that the processor 140 and memory 150 interact with the other components of the device 110 to perform a variety of functions. The processor 140 may include or implement various modules and execute programs for initiating different activities such as launching an application, transferring data and toggling through various graphical user interface objects (e.g., toggling through various display icons that are linked to executable applications).

Figure 2:
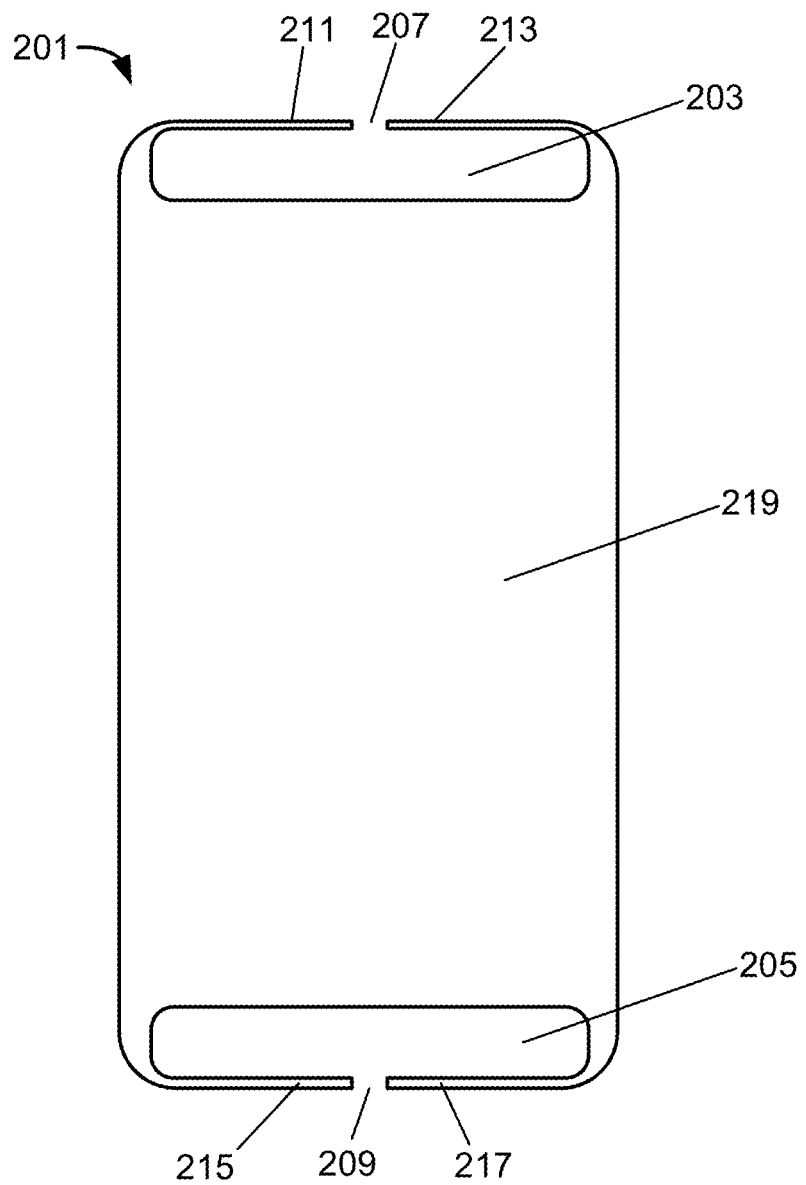
FIG. 2 is a plan view of a one-piece metal back housing in accordance with an embodiment of the described principles.

Turning to FIG. 2, this figure shows a metal unibody housing 201 for a portable communication device such as device 110 of FIG. 1. It will be appreciated by those of skill in the art that the illustrated housing is simply an example, and that other configurations of unibody housing may be used. That said, in the illustrated example, the metal housing 201 is formed having a first opening 203 and a second opening 205, with the first opening 203 being located in the upper portion of the metal housing 201 and the second opening 205 being located in the lower portion of the metal housing 201.

In addition, a first break 207 is located in the top of the metal housing 201, causing the first opening 203 to be non-closed. Similarly, a second break 209 located in the bottom of the metal housing 201 causes the second opening 205 to be non-closed. The result of the first opening 203 and second opening 205, in conjunction with the first break 207 and second break 209 respectively, is that two antenna arms are formed at each of the top and the bottom respectively of the metal housing 201.

In particular, a pair of antenna arms 211, 213 is formed at the top of the metal housing 201 and another pair of antenna arms 215, 217 is formed at the bottom of the metal housing 201. The remainder of the metal housing 201 may be referred to herein for clarity when required as the main body 219 of the metal housing 201. The antennas 211, 213, 215 and 217 may be referred to herein as antenna 1 (ant-1), antenna 2 (ant-2), antenna 3 (ant-3) and antenna 4 (ant-4).

In a typical implementation, top antennas such as the ant-1 and ant-2 antennas (211, 213) in the illustrated example, may be used for GPS geo-location services, WiFi communications, and cellular communications, while the bottom antennas such as the ant-3 and ant-4 antennas (215, 217) may be dedicated to support cellular communications. It will be appreciated by those of skill in the art that other antenna assignments may be used instead.

In an embodiment, two of the available antennas are reused to provide NFC communications. In particular, for example, the two top antennas ant-1 (211) and ant-2 (213) may be differentially driven to form a single turn loop antenna surrounding the top opening 203. The effective circuit configuration of this architecture, including GPS, WiFi and cellular communications, is shown schematically in FIG. 3.

Figure 3:
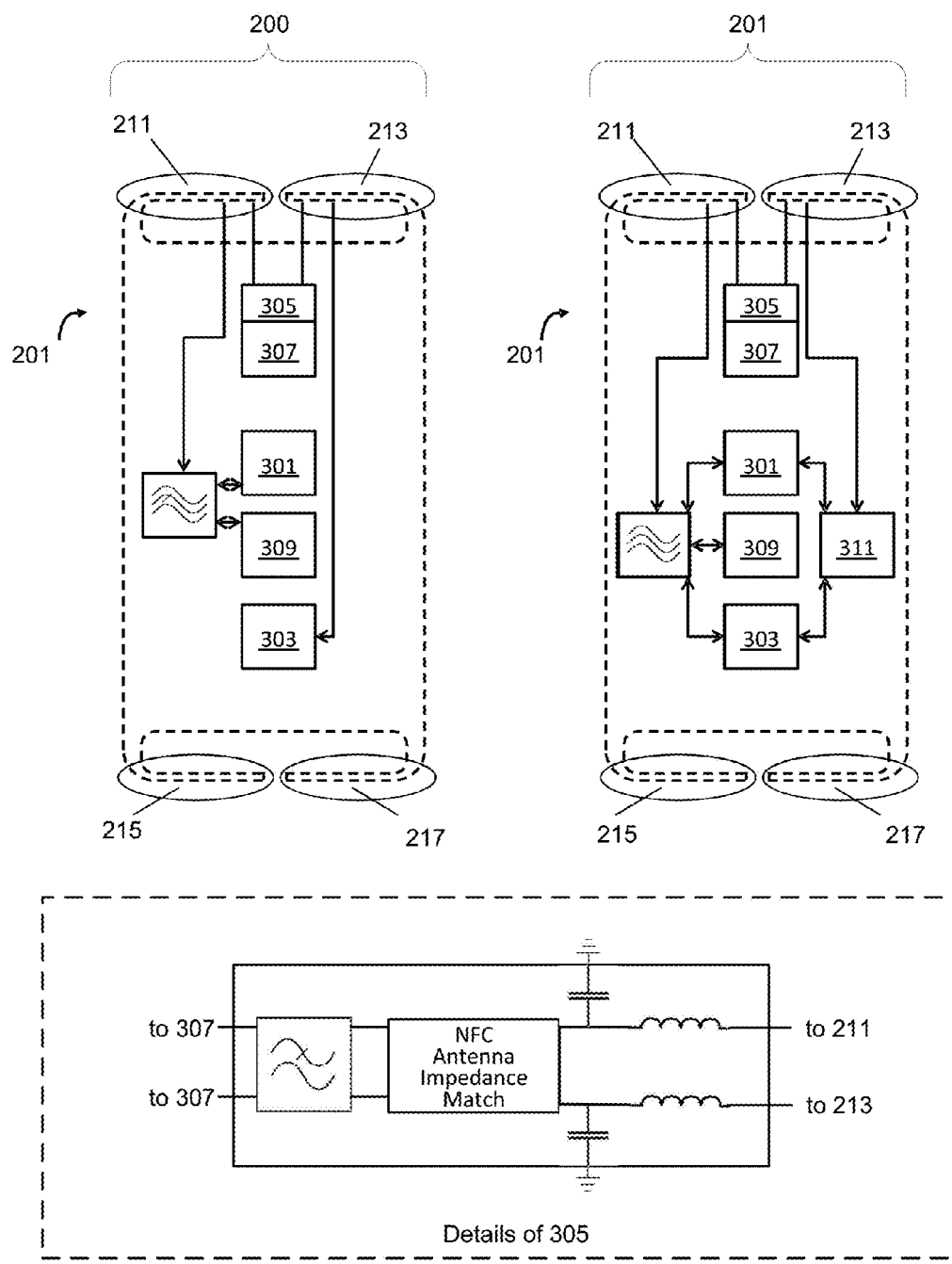
FIG. 3 is an overview diagram of WiFi, GPS, cellular and NFC transceivers and their connection to the antennas in accordance with an embodiment of the disclosed principles.

As can be seen in FIG. 3, in one embodiment 200, the device may include a WiFi transceiver 301 and a GPS receiver 309 linked to ant-1 (211) via a diplexer. The device may also include a cellular transceiver 303 which may be linked to ant-2 (213), which operates at a different frequency than that used by the WiFi transceiver 301 and GPS receiver 309. Similarly in another embodiment 202, a WiFi transceiver 301, a GPS receiver 309 and a cellular transceiver 303 may be linked to ant-1 (211) via a triplexer. The device may also include a secondary WiFi transceiver and it may share ant-2 (213) with the cellular transceiver via high band antenna switching modules 311. It will be appreciated that the device need not implement GPS, WiFi and cellular communications via the top antennas 211, 213; rather, the example of FIG. 3 is given to illustrate the fact that, in an embodiment of the disclosed principles, the use of either or both of the top antennas for GPS, WiFi or cellular communications does not interfere with their use for NFC communications. Similarly, the use of both of the top antennas for NFC communications does not interfere with their use for GPS, WiFi or cellular communications.

The frequency at which NFC signals are generated is set by relevant standards at 13.56 MHz. The frequency band at which GPS signals are received by mobile devices is centered at 1.575 GHz. Similarly, WiFi transceivers communicate on frequency bands that are centered at 2.45 GHz and 5.2 GHz and cellular transceivers communicate between the frequencies of 500 MHz and 3 GHz.

In the illustrated embodiment presented in FIG. 3, a differential drive circuit 305 for NFC communications is shown. The differential drive circuit 305 is linked to the NFC controller 307, which handles the encoding and decoding of NFC signals and executes the instructions provided by the applications processor 140 of FIG. 1. The differential drive circuit 305 is also linked to both ant-1 (211) and ant-2 (213), with each antenna forming a respective side of the differential, and in essence, creating a single turn loop antenna for NFC communications. Thus, the differential drive circuit 305 contains components to decouple the NFC transceiver from the GPS receiver, WiFi transceivers and cellular transceiver.

The spectral separation between the operating frequency of the NFC transceiver and the others allows for a simple decoupling mechanism consisting of an inductor and a capacitor. As shown in FIG. 3, a set of inductors placed between the NFC antenna impedance match and the physical connections to ant-1 (211) and ant-2 (213) may decouple the NFC transceiver from the other transceivers using these top antennas. Similarly, a series capacitor between the other transceivers and their respective top antenna (ant-1, ant-2 or both depending on the embodiment) may decouple these transceivers from the NFC transceiver. Those skilled in the art may appreciate that the decoupling can also be achieved in numerous other ways, such as switching.

Figure 4:
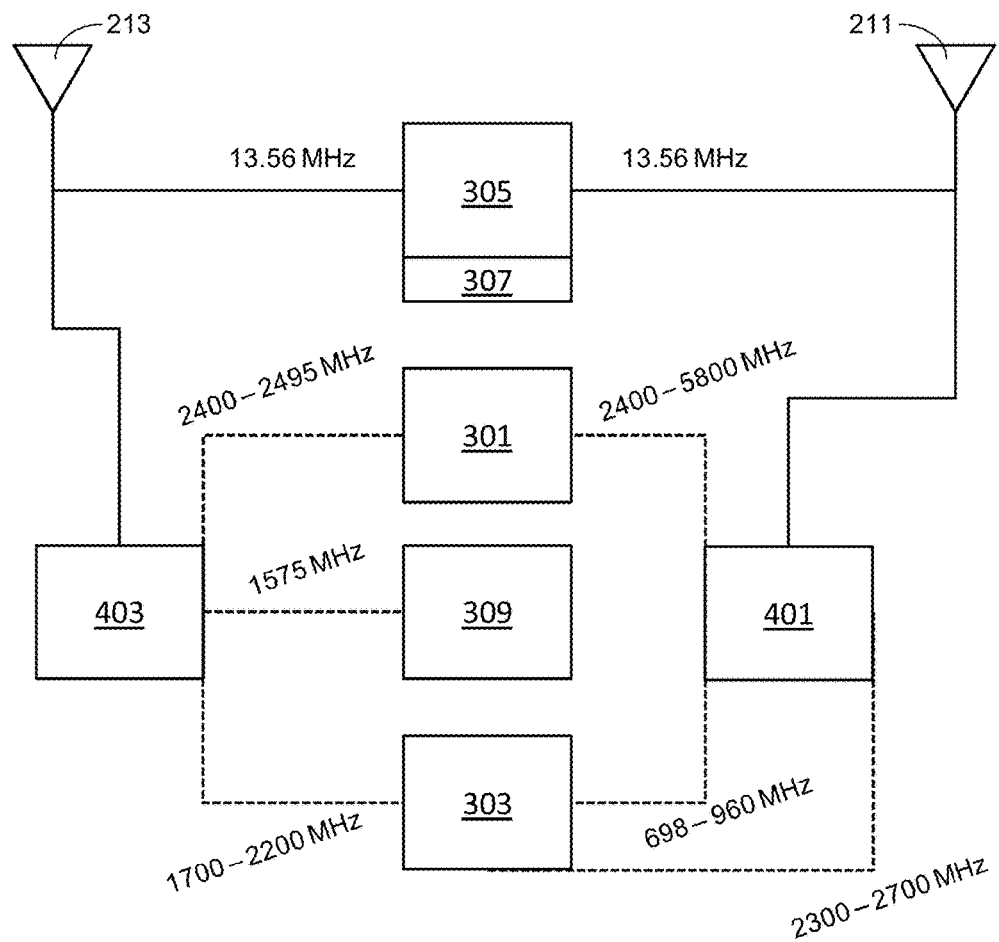
FIG. 4 is a modular schematic of WiFi, GPS, cellular and NFC transceivers and their connection to the antennas in accordance with an embodiment of the disclosed principles.

FIG. 4 shows a modular schematic for implementing the architectures shown in FIG. 3. Although those of skill in the art will appreciate that other circuit constructions may be used to implement the disclosed principles, FIG. 4 provides an example to clarify operation of the system for those of skill in the art as well as those of more casual acquaintance with the art.

In the illustrated implementation, the WiFi transceiver 301, the GPS receiver 309, and the cellular transceiver 303 are linked to a dedicated antenna via a multiplexer 403. Multiplexer 403 may route the incoming GPS signals in 1575 MHz band to the GPS receiver, WiFi signals in 2400-2495 MHz band to the WiFi transceiver, and cellular signals in 1700-2200 MHz band to the cellular transceiver. The dedicated antenna may be, for example, ant-2 (213). The other antenna 211 is linked to the WiFi transceiver 301 and also to the cellular receiver 303 through a high band antenna switch module 401 or the like. In this way, incoming low-band cellular signals such as those in 698-960 MHz band and high-band cellular signals such as those in the 2300-2400 MHz band and the 2500-2690 MHz band are switched to the cellular transceiver 303. Similarly, incoming 2400 MHz (2.4 GHz) WiFi signals are switched to the WiFi transceiver 301.

These bands are similar enough to be supported by the same physical antenna structure (211 and 213) while also being distinct enough to be efficiently separated at the switch module 401 or at the multiplexer 403. The switch module operates to allow both outgoing 2.4 GHz WiFi signals and outgoing high band cellular signals to share a single antenna 213. Alternatively, rather than switching inputs, the cellular transceiver 303 and WiFi transceiver 301 may also be multiplexed to and from the shared antenna 213. Similarly, cellular transceiver 303, WiFi transceiver 301, and GPS receiver 309 may be multiplexed to and from the shared antenna 211. In general, the cellular transceiver 303 will have priority with respect to usage of a shared antenna in a switched module based embodiment.

The differential drive circuit 305 for NFC communications is shown linked between ant-1 (211) and ant-2 (213). The differential drive circuit 305 is part of, or is controlled by, an NFC controller 307. Given the frequency difference between NFC communications and WiFi or cellular communications and the existence of LC based decoupling circuitry, the use of ant-1 (211) and ant-2 (213) to provide NFC communications does not affect the use of these antennas for WiFi, GPS or cellular signal reception and transmission.

Figure 5A:
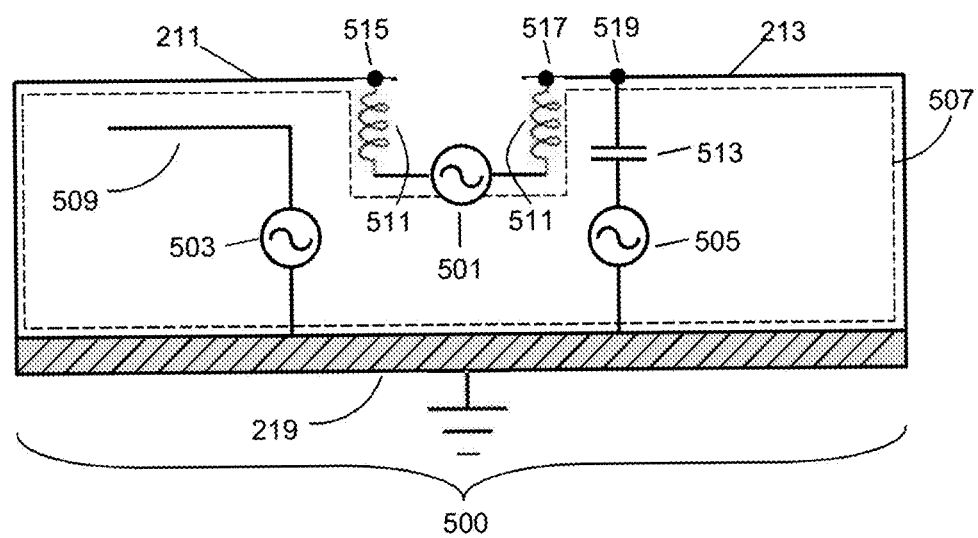
FIG. 5A is a circuit level diagram of a WiFi antenna drive configuration in accordance with an embodiment of the disclosed principles.
Figure 5B:
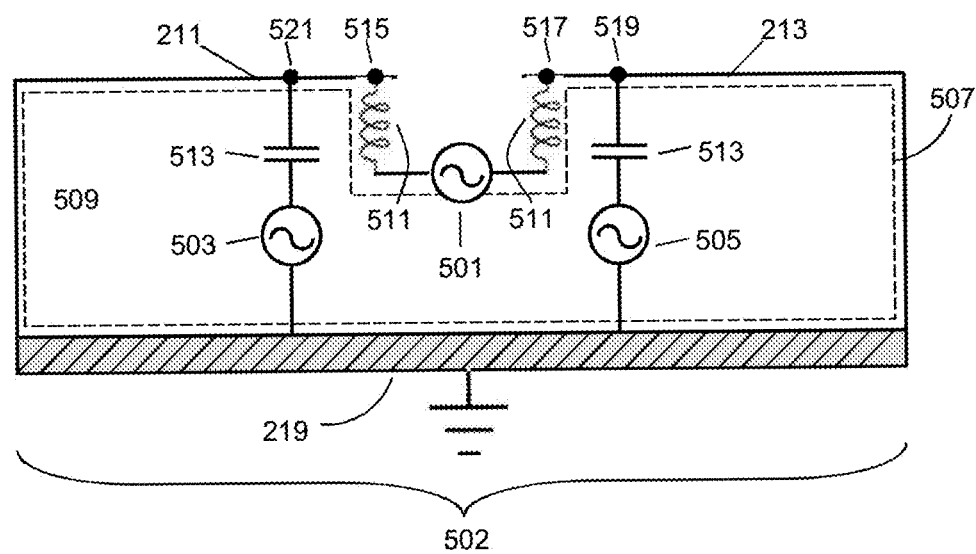
FIG. 5B is a circuit level diagram of a GPS antenna drive configuration in accordance with an embodiment of the disclosed principles.
Figure 5C:
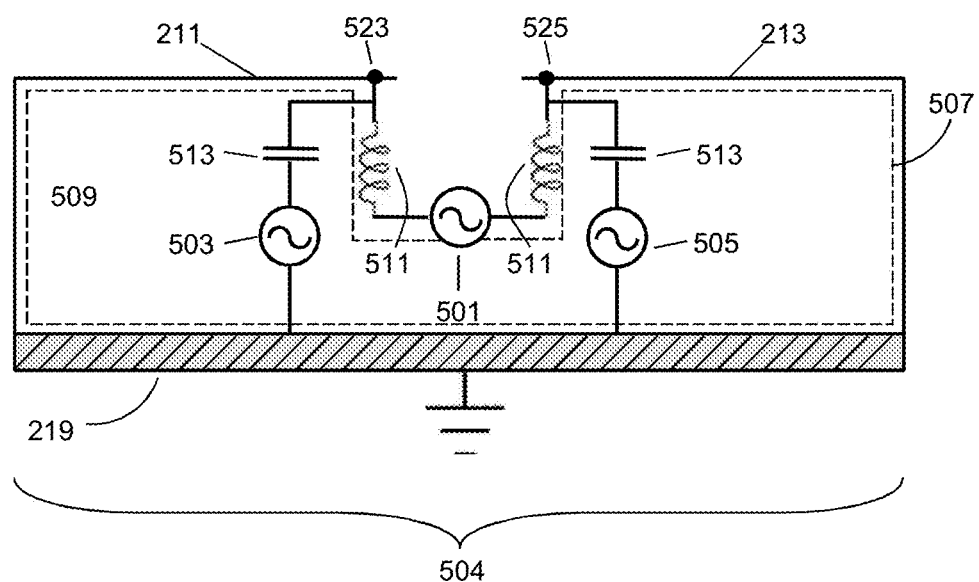
FIG. 5C is a circuit level diagram of an NFC antenna drive configuration in accordance with an embodiment of the disclosed principles.

The circuit schematic of FIGS. 5A, 5B and 5C illustrate more precisely the manner in which the antennas 211, 213 are driven for NFC communications. In the illustrated example 500 of FIG. 5A, ant-1 (211) is excited via coupling from a nearby trace 509 which is linked to the antenna drive 503. Note that in another illustrated example 502 of FIG. 5B, ant-1 (211) is excited directly by antenna drive 503 via a mechanical connection 521. In embodiments where antenna drive 503 is directly connected to the ant-1 (such as 502 of FIG. 5B and 504 of FIG. 5C), a decoupling capacitor 513 is connected in series with the antenna drive 503. The purpose of the series capacitor is to block the energy generated by the NFC antenna drive 501 from coupling into the antenna drive 503.

In one embodiment, the drive 503 may be connected directly to the WiFi transceiver 301, GPS receiver 309 and cellular transceiver 303 (FIG. 4). The antenna drive 503 is referenced to ground, as provided by the main body 219 of the metal housing 201. In the illustrated examples 500, 502 and 504 of FIGS. 5A, 5B and 5C respectively, the other antenna, ant-2 (213), is excited directly by an antenna drive 505. Similarly, a decoupling capacitor 513 is connected in series with the antenna drive 505 to block the NFC energy from the antenna drive 501. In one embodiment, antenna drive 505 may be connected to a cellular transceiver 303 (FIG. 4) and also to a WiFi transceiver through a switch 401. The antenna drive 505 is also referenced to ground, as provided by the main body 219 of the metal housing 201. Note that in another embodiment (not shown), ant-2 may be excited by a nearby trace that is connected to the antenna drive 505. In this case, a series decoupling may not be necessary since the antenna drive 505 would be physically disconnected from ant-2.

NFC loop 507 is created by both antennas 211, 213 and the main body 219 of the metal housing 201 and it is differentially driven at the gap between the antennas 211, 213. The NFC antenna drive 501 is exciting ant-1 (211) with one pole of the differential feed and is exciting ant-2 (213) with the other pole of the differential feed. The NFC antenna drive 501 and decoupling inductors 511 are part of the differential drive circuit 305, which is subsequently connected to the NFC controller 307 (FIG. 3). In the embodiments shown in FIGS. 5A, 5B and 5C, decoupling inductors 511 are employed to block the electromagnetic energy produced by antenna drives 503 and 505 from coupling into the NFC antenna drive 501.

In the embodiments 500 and 502 of FIGS. 5A and 5B respectively, the NFC antenna drive 501 is connected to ant-1 via a mechanical connection 515 and to ant-2 via a mechanical connection 517. In the latter embodiment (502), the antenna drive 503 is connected to ant-1 via a mechanical connection 521 and the antenna drive 505 is connected to ant-2 via a mechanical connection 519. In the embodiment 504, the mechanical connections 515 and 521 are combined into 523, while keeping the decoupling inductors and capacitors in place. Similarly, mechanical connections 517 and 519 are combined into 525. Thus, the number of mechanical connections to the top antennas is reduced from four to two without compromising the antenna performance. This reduction translates into valuable physical space savings and reduced manufacturing cost.

In the illustrated configurations, and with respect to NFC communications, the device 110 is enabled to operate as an NFC card emulator, an NFC card reader or an NFC peer. In the first case, the device 110 responds to NFC polling pulses from an external source by emitting an NFC response mimicking a particular NFC card. In the second case, the device 110 polls an NFC card (actual or emulated) and receives and processes an appropriate NFC response. In the last case, the device communicates with another NFC enabled device via the transmission and reception of NFC transmissions.

Figure 6:
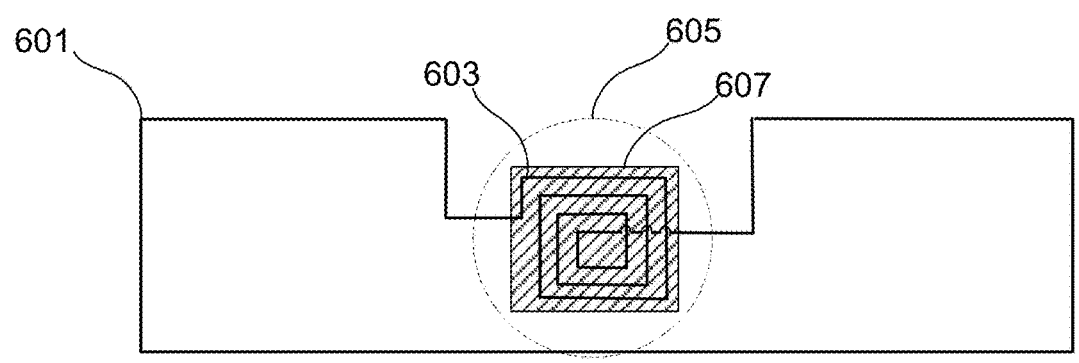
FIG. 6 is a circuit view of a coil configuration used to implement an NFC antenna in accordance with an embodiment of the disclosed principles.

Because the NFC coil path 507 shown in dashed outline makes only a single turn, its inherent inductance may be less than ideal. Therefore, in an embodiment, the physical layout of the NFC coil 507 employs a smaller physical loop along the larger path that is shown in dashed outline in FIG. 5. The smaller loop 603 and its relationship to the larger loop 601 are shown in FIG. 6. This smaller loop 603 not only increases the inherent inductance of the NFC coil, but also its placement between ant-1 (211) and ant-2 (213) reduces the likelihood of a null in the near magnetic field.

As can be seen, the larger loop 601, corresponding to the dashed path 507 of FIGS. 5A, 5B and 5C, connects in series to a smaller loop 603 having the same orientation. The multi-turn smaller loop 603 increases the inductance of the NFC coil substantially over that of the single-turn larger loop 601 alone.

In an embodiment, the smaller loop 603 is positioned in the central upper section of the device where it overlies an audio speaker 605 of the device. In the illustrated example, the audio speaker 605 is shown by a circular dashed outline. With the smaller loop 603 overlaying the speaker 605, a ferrite shield 607 can be located beneath the smaller loop 603. This placement allows interference reduction between the internal metallic components of the device and the NFC operation. In addition, the metal provides shielding between the GPS, WiFi or cellular antennas in the vicinity and the lossy ferrite material in 607, thereby mitigating the potential performance deficiencies.

In addition to providing enhanced NFC capabilities, the loop structure shown in FIG. 6 is also employed in an embodiment to provide wireless charging for the device. In particular, the A4WP protocol operates at 6.78 MHz, which corresponds to one half of the typical NFC frequency. As such, the A4WP protocol uses resonant coupling rather than inductive coupling, such that a low inductance device coil may be coupled if the real impedance of the device coil is matched to the real impedance of the driving coil. The driving coil may be located within a table, desk or shelf whereupon a device may be placed for wireless charging.

In an embodiment, the device charging coil is as shown in FIG. 6 but is located at the opposite end of the device from the NFC coil. Moreover, a capacitance may be provided in series or parallel with the coil to match the real impedance of the device charging coil to that of the charging coil. In this way, a portable communications device having a unibody metal back housing may nonetheless support wireless charging as well as WiFi, cellular, and NFC capabilities.

It will be appreciated that various systems and processes for improving NFC antenna configuration and operation have been disclosed herein, along with methods and configurations for enabling wireless device charging. However, in view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A portable electronic communication device comprising:
   a housing including a one-piece metal housing, the one-piece metallic housing having two opposing ends and an opening at each end, thereby forming two openings, each opening having a distal border, and having a break in the distal border, thus forming a broken distal border, such that the broken distal border of each opening forms two antennas connected to the remainder of the one-piece metal housing;
   a cellular antenna drive connected to a first one of the two antennas associated with a first one of the openings;
   a WiFi antenna drive connected with a second one of the two antennas associated with the first opening; and
   a differential NFC (near field communication) drive connected between the first and second antennas to drive an NFC loop comprising the first and second antennas and the remainder of the one-piece metal housing.

2. The portable electronic communication device in accordance with claim 1, wherein one of the first and second antennas supports GPS geo-location services, WiFi communications, cellular communications or a combination of these.

3. The portable electronic communication device in accordance with claim 1, wherein the NFC antenna drive and a non NFC antenna drive share a mechanical connection to the first antenna and the NFC antenna drive and the non NFC antenna drive share a mechanical connection to the second antenna.

4. The portable electronic communication device in accordance with claim 2, wherein the one of the first and second antennas is switched between WiFi communications and cellular communications.

5. The portable electronic communication device in accordance with claim 2, wherein the one of the first and second antennas multiplexes WiFi communications, GPS geo-location services, and cellular communications.

6. The portable electronic communication device in accordance with claim 1, wherein the differential NFC drive is decoupled from the cellular drive, GPS drive, and WiFi drive with an inductor-capacitor (LC) circuit.

7. The portable electronic communication device in accordance with claim 1, wherein the cellular antenna drive, GPS antenna drive, and WiFi antenna drive are connected to common mode feeds that are referenced to ground.

8. The portable electronic communication device in accordance with claim 1, wherein the remainder of the one-piece metallic housing provides the reference ground.

9. The portable electronic communication device in accordance with claim 1, further comprising a multi-turn secondary NFC loop connected to the primary NFC loop, driven by the NFC driver in the same orientation as the NFC loop.

10. The portable electronic communication device in accordance with claim 9, further comprising a ferrite shield overlapping the secondary NFC loop.

11. The portable electronic communication device in accordance with claim 9, further comprising an audio speaker overlapping the secondary NFC loop.

12. A portable electronic communication system comprising:
   a conductive loop having a break forming two antennas connected to the remainder of the loop;
   a cellular antenna drive connected to a first one of the antennas;
   a WiFi antenna drive connected with a second one of the antennas; and
   a differential NFC (near field communication) drive connected between the first and second antennas such that the conductive loop forms an NFC antenna.

13. The portable electronic communication system in accordance with claim 12, wherein the WiFi antenna drive is switchably connected to the first antenna.

14. The portable electronic communication system in accordance with claim 12, wherein the cellular antenna drive, GPS antenna drive, and WiFi antenna drive are connected to a common mode feed that is referenced to ground.

15. The portable electronic communication system in accordance with claim 12, wherein the differential NFC drive is physically connected but electrically separated from the cellular drive, GPS drive, and WiFi drive with an inductor-capacitor (LC) circuit.

16. The portable electronic communication system in accordance with claim 12, further comprising a multi-turn secondary NFC loop connected to the NFC loop, driven by the NFC driver in the same orientation as the NFC loop.

17. The portable electronic communication system in accordance with claim 16, further comprising a ferrite shield overlapping the secondary NFC loop.

18. The portable electronic communication system in accordance with claim 16, further comprising an audio speaker overlapping the secondary NFC loop.

19. A portable communication device antenna system comprising:
   first and second antennas, each having one end thereof connected to ground and another end floating;
   a cellular antenna drive connected between the first antenna floating end and ground;
   a WiFi antenna drive connected between the second antenna floating end and ground; and
   an NFC (near field communication) antenna drive connected between the floating ends of the first and second antennas.

20. The portable communication device antenna system in accordance with claim 19, wherein the NFC antenna drive is connected to a differential feed.

* * * * *